Aug. 4, 1964 H. J. NICHOLS 3,143,366
QUICK KEYLESS COUPLINGS
Original Filed July 27, 1953 3 Sheets-Sheet 2
FIG. IV
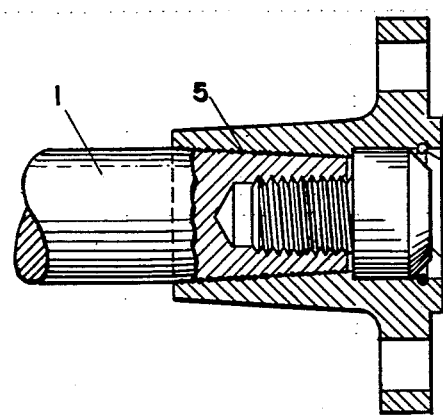
FIG. V
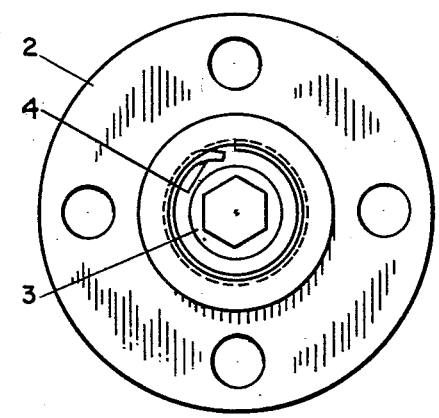
FIG. VIII
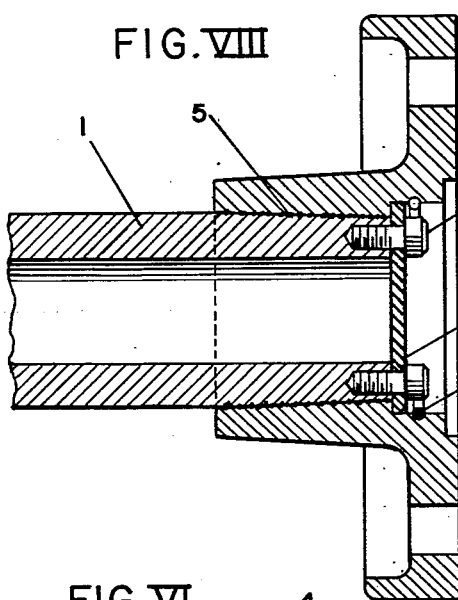
FIG. IX
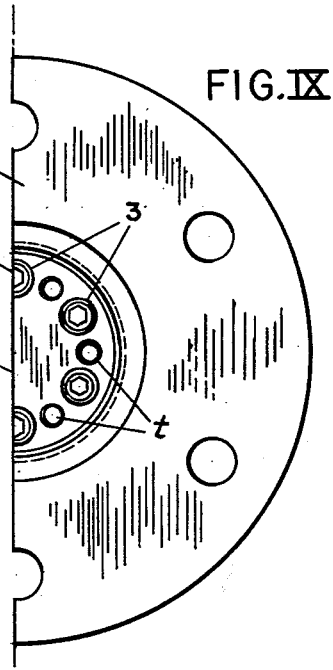
FIG. VI
FIG. VII
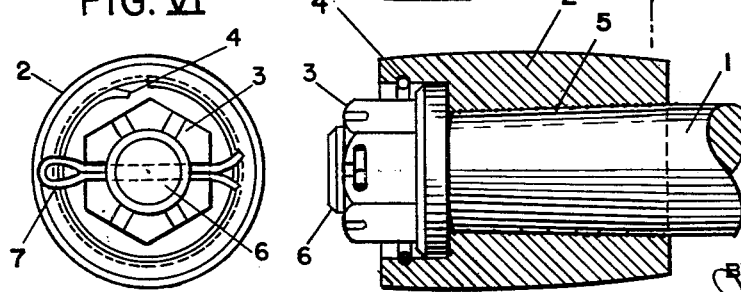
INVENTOR
Harry J. Nichols
BY
ATTORNEY

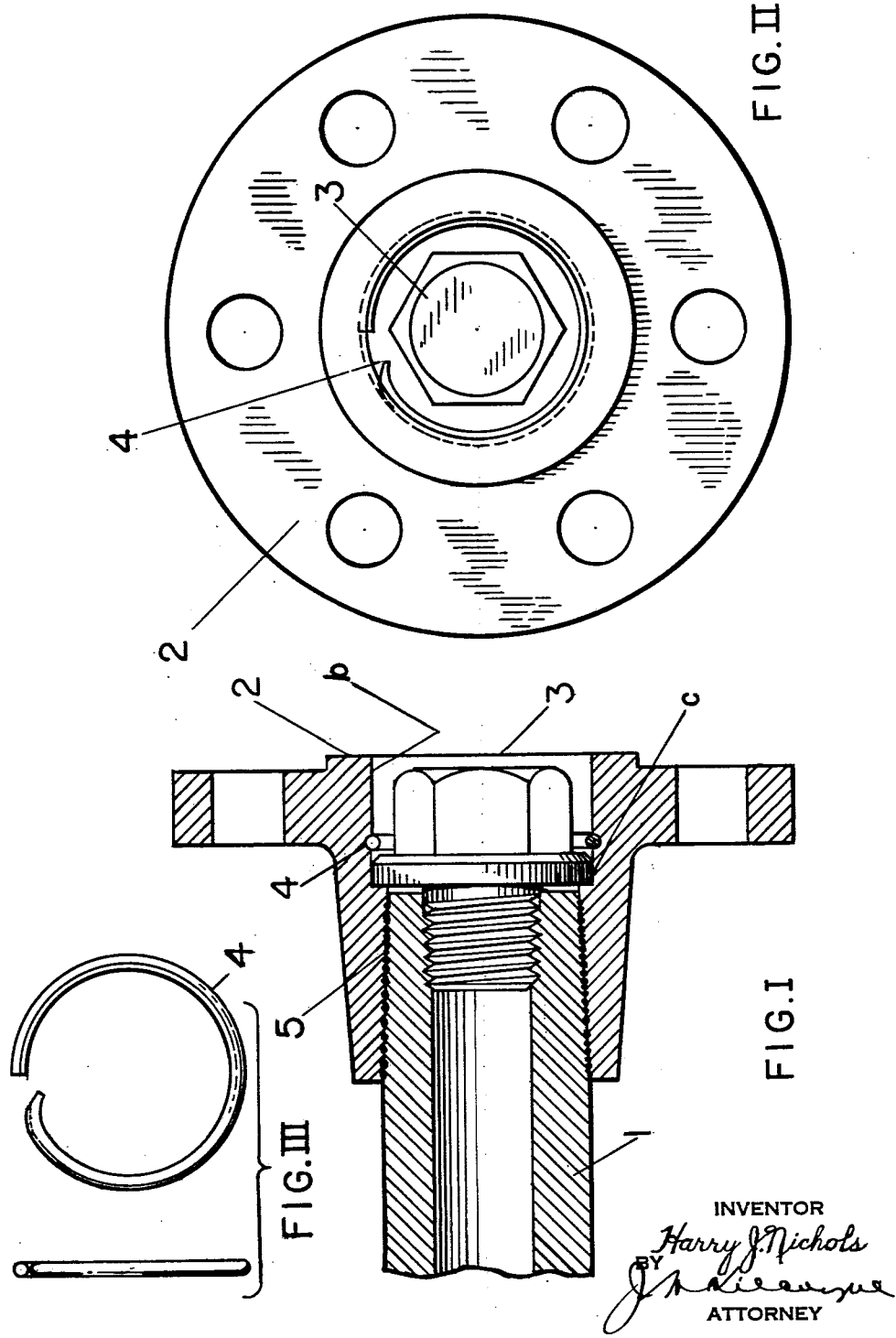

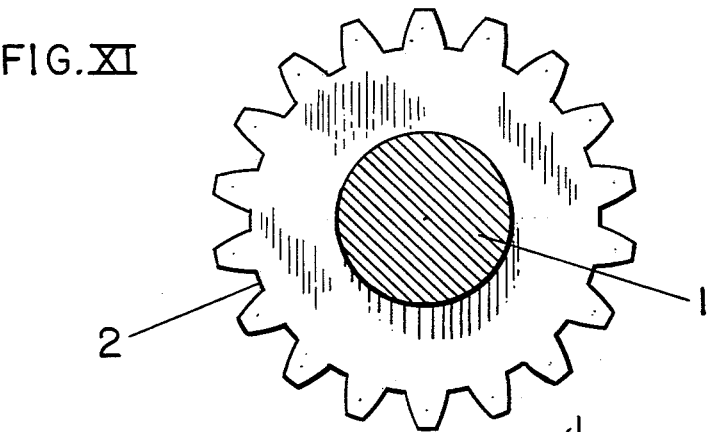
FIG. XI
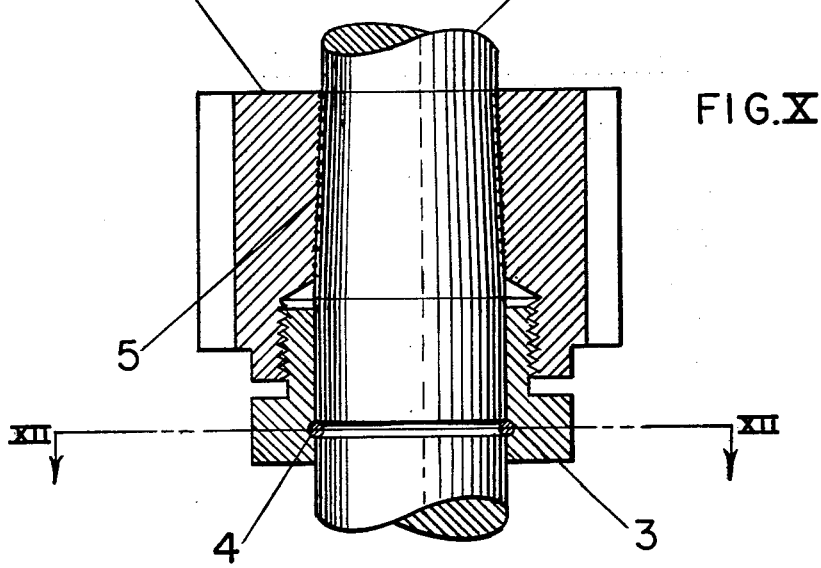
FIG. X
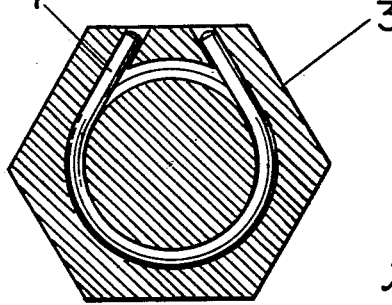
FIG. XII

United States Patent Office 3,143,366
Patented Aug. 4, 1964

3,143,366
QUICK KEYLESS COUPLINGS
Harry J. Nichols, 1122 Rue Ave., Point Pleasant, N.J.
Continuation of application Ser. No. 370,438, July 27, 1953. This application Mar. 27, 1959, Ser. No. 802,330
4 Claims. (Cl. 287—53)

This invention relates to demountable keyless shaft couplings and more particularly to novel and versatile means adapted in various embodiments to mount quickly and easily a hub member on a shaft member, whether solid, hollow or tubular; and thereafter quickly and easily to dismount that hub member from the shaft member.

This application is a continuation of my application Serial No. 370,438 filed July 27, 1953, now abandoned.

In the prior art, there have been various forms of shaft couplings; but those forms designed to transmit torque have generally been provided with some sort of auxiliary fastening part, such as a key, feather, spline, set-screw or taper pin for transmitting without slipping torsional, and in some instances axial forces, from the shaft to a hub mounted thereon, and vice versa. Such ordinary shaft couplings, while widely used, have the disadvantage that the parts must be precisely and tightly fitted at assembly to prevent their working loose in service; and as one consequence the fastening part and hub are usually difficult to dismount, particularly after rusting or corrosion in service has occurred. Hence some special auxiliary appliance, commonly called a hub-puller or wheel-puller, is generally required to remove the hub from the shaft. In the case of keys, which are used most often, a slot or key-way must be provided in both the hub and shaft, and in addition to the considerable extra cost of machining these slots and fitting the key thereto, there is the further substantial disadvantage that the strength of the shaft is materially reduced by cutting the key-way therein. Further, ordinary methods of fixing hubs on shafts often entail substantial loss of time and money when the hub has to be removed from the shaft to effect repairs or replacements.

The principal object of the present invention is therefore to overcome the disadvantages and draw-backs of the prior coupling art, and to provide novel, simple and inexpensive coupling means which provides an equal or superior positive connection between the shaft and hub; which avoids any cutting of the shaft such as would tend to reduce its strength; and which provides in itself a ready and quick means for mounting the hub tightly on the shaft, and also to dismount the hub from the shaft, merely by the use of an ordinary wrench.

A further object of the invention is to provide a method and suitable devices for carrying the method into effect which will enable a hub to be mounted quickly but rigidly on a shaft and subsequently quickly dismounted therefrom without the need for special appliances other than a suitable wrench of ordinary type.

Another object is to provide means for mounting a hub on a shaft which eliminates the need for any key, spline, or coupling pin to transmit force therebetween, and hence avoids cutting a keyway or hole in the shaft, thus avoiding any reduction of the strength of the latter.

A further object is to provide simple coupling means whereby a combination of compressive and frictional forces are augmented by the locking action of a myriad of minute hard particles to effect a tight, strong and positive driving connection between a hub member and a shaft.

A further object is to provide coupling means between a hub and a shaft which can be adjusted to permit of relative slippage in the event of the accidental application of an overload driving torque, without damage to the parts of the coupling.

Other objects and features will be in part obvious and in part hereinafter pointed out in connection with the following description, the accompanying drawings and the appended claims.

The invention will be more clearly understood from the following description relating to various embodiments of the invention, and from the drawings in which:

FIG. I shows in axial section one embodiment of the invention.

FIG. II shows a right end view of the construction shown in FIG. I.

FIG. III shows a detail view of a thrust ring utilized in carrying out the invention.

FIGS. IV and V show in axial section and right end views respectively a second embodiment of the invention.

FIGS. VI and VII show an axial section and right end view respectively of the application of the invention to a marine propeller hub.

FIGS. VIII and IX illustrate in similar manner yet another embodiment of the invention as applied to large shafts.

FIGS. X to XII show a principal view in part axial section, top end view and a detail cross section of yet another embodiment of the invention.

Referring first to FIGS. I and II, the readily demountable half-coupling there shown illustrates the application of the teaching of the invention to connecting rigidly but demountably a hollow shaft 1 and a hub 2; the latter having an integral flange adapted for quick fastening to a similar complementary flange, not shown. For this purpose, the flange is shown as having a plurality of bolt holes located evenly spaced along a circle concentric with the shaft axis; whereby the two flanges can be fastened together in readily demountable manner by means of bolts or cap screws in the usual way. The term shaft, as used herein, implies generally a shaft-like member, whether solid, hollow or tubular, as for example a shaft, rod, tube, pipe, stud, etc. Likewise, the term hub as used herein implies generally a hub-like member, as for example a hub, flange, collar, sleeve, pinion, gear, sprocket, pulley, etc.

The shaft 1 is provided with a tapered portion, which usually is a tapered end, the degree of taper usually being in the range of one inch to one-half inch per linear foot. The larger taper mentioned can be used advantageously for shafts of small size, or where slippage on application of over-load torque is desired; while the smaller taper can be used advantageously for large shafts for heavy duty service. This follows, of course, from the fact that a small taper produces greater compression force for a given axial force applied at assembly, according to the well-known wedge principle. Also, shaft 1 in this embodiment is provided with an axial bore threaded at the open end and adapted to mate with a complementally threaded screw 3, constituting the rotatable element of a pair of coacting screw-threaded members for converting reversible torque into reversible axial thrust, herein termed the jack-screw 3, as for example a collar-screw as shown; the nominal diameter of the jack-screw 3 in this case preferably being approximately five-eighths of the shaft diameter, and ranging from say one-half to three-fourths of the shaft diameter. The length of the threads on jack-screw 3 should approximate the nominal diameter.

The hub 2 is provided with a tapered bore complemental to the tapered shaft portion—the usual key slot being omitted in both parts. Due to the elimination of any key slot, which tends to weaken the hub, the diameter of the small end of the hub can be made 5/4 times the shaft diameter, rather than the conventional 3/2 times the shaft diameter. Also, due to the relatively small hub, the outside diameter of the flange can be made three times the shaft diameter, rather than the conventional four times the shaft diameter. Thus, the size and weight of this coupling can be materially reduced, as compared to conventional keyed flange couplings of the same load capacity.

Hub 2 is also provided with an axial counter bore $b$ extending from the flange end and preferably deep enough to accommodate the head of jack-screw 3. The diameter of this bore is made somewhat larger than the small diameter of the tapered bore; thus providing a narrow shoulder or abutment against which the collar $c$ of jack-screw 3 bears, as shown. The counter bore $b$ is further provided with an internal circumferential annular groove adapted to receive a demountable ring 4, herein termed the uncoupling thrust ring. While thrust ring 4 can have various forms in light duty applications, as for example that of certain commercial "retainer" rings, the preferred form for heavy duty applications is that of a split "snap-ring" made of hard round "spring" wire, and preferably having at least one end beveled outwardly and bent inwardly to facilitate removal. (See FIG. III.) It has been found that snap-rings of this type when assembled halfway in a circumferential half-round groove under the maximum compression which the resilient properties of the wire permit are capable of holding an enormous axial thrust force; the allowable axial thrust load being calculable by the approximate empirical formula:

(1)   $Ta = 10,000\ D^{3/2}$ pounds in which $Ta$=allowable thrust in pounds and $D$=nominal ring diameter in inches. The holding ability of the thrust ring 4 can also be augmented by providing a small chamfer or bevel on the outer edge of the collar of the jack-screw, as shown. The operating principle is, of course, that on application of thrust force by jack-screw 3 to thrust ring 4, the latter becomes wedged tightly in the groove, and cannot be dislodged except by shearing out the supporting wall of the groove. It should be noted here that thrust ring 4 is located so that a small gap exists between itself and the collar of jack-screw 3, thereby enabling that screw to be wrenched loose before engaging the thrust ring for purposes of readily dismounting the hub, as described hereinafter. It should be further noted that thrust ring 4, as disclosed, locks itself in position and cannot be shaken loose by vibration. Also, that it can be assembled and disassembled without special tools, merely by using a small screw-driver or cotter-hook, commonly found in a mechanic's tool-kit. Moreover, it is capable of "blind" assembly; that is, it can be mounted and removed without direct vision.

A special locking composition 5, described hereinafter, containing as the invariable ingredient small, extremely hard particles of controlled size distributed in a vehicle, is preferably applied at assembly between the mating tapered surfaces, so that a myriad of such grains are embedded in both of the mating surfaces when they are drawn tightly together. For purposes of illustration, the particles of the locking composition 5 are shown enlarged, being relatively much smaller in practice.

The assembly of the parts of the coupling device illustrated is preferably effected as follows: The locking composition 5 is applied evenly to one of the tapered surfaces of the mating parts, say the shaft, and then the parts are assembled together and rotated a few turns to distribute the composition evenly on the mating surfaces. The parts are then pushed firmly together, and any excess of composition carefully wiped away. The threaded portion of jack-screw 3 is then inserted in the threaded bore of shaft 1, and jack-screw 3 turned by a socket wrench in the usual manner to draw the mating members into tight contact; in other words, the jack-screw is screwed-up "wrench-tight." Thus, the particles of locking composition 5 are indented into the mating surfaces as these are forced substantially into contact, due to the powerful screw action and the wedging coaction of the two mating members. The hard particles thereby become embedded partly in shaft 1 and partly in hub 2, thus functioning like a myriad of separate tiny keys which lock these members together more positively than any ordinary forced-on or shrunk-on fit.

In this connection, we can consider a comparison between a hub secured on a shaft merely by friction, whether produced by a forced-on or shrunk-on fit between the two, and the positive connection provided by the invention. The accepted common empirical formula for calculating the working strength of a shaft in torsion is:

(2)   $T = \dfrac{S \times d^3}{5.1} = 1605 \times d^3$ inch-pounds in which $T$=allowable torque in inch-pounds; $d$=diameter of shaft in inches; and $S$=allowable torsional shearing stress in pounds per sq. in.=8500 approximately for small shafts. Since this torque is theoretically applied at the circumference of the shaft, the twisting moment between shaft and hub is:

(3)   $T = F \times \dfrac{d}{2}$ whence (4)   $F = \dfrac{2 \times T}{d} = \dfrac{2 \times 1650 \times d^3}{d} = 3300 \times d^2$ pounds in which $F$ is the frictional force required to prevent slippage between shaft and hub. Hence, for example, in the case of a forced fit, an axial force of approximately 3300 pounds would be required to seat the hub on a shaft one inch in diameter; assuming of course that friction alone were relied upon to secure the hub and shaft in driving relation.

We have of course the further relation:

(5)   $F = m \times C$ pounds in which $m$ represents the coefficient of friction and $C$ the total compressive force which the hub exerts on the shaft. In the case of a shaft one inch in diameter, and taking the usual value of $m = .20$ (dry coefficient of friction), the compressive force of the hub on the shaft in order to provide in the coupling the full driving capacity of the shaft would need to be:

(6)   $C = \dfrac{F}{m} = \dfrac{3300}{.20} = 16{,}500$ pounds

But if a way could be found whereby the effective value of the coefficient of friction $m$ could be raised, say to unity, *without a proportional increase in the axial force required to seat the hub on the shaft,* the compressive force of the hub on the shaft could be decreased proportionally, that is to one-fifth; or conversely, the driving capacity of the connection could be substantially increased. This, in effect, is achieved in the present invention by the use of locking composition 5 between the hub 2 and shaft 1, according to the teaching of the invention. Thus, locking composition 5 acts as a lubricant when hub 2 is being seated on shaft 1, which off-sets the extra axial force required to embed the hard particles into the metal surfaces. Consequently, the axial force necessary to seat the hub on the shaft so as to provide full driving capacity of the shaft is substantially less in applying the invention than in the case of an ordinary forced-on or shrunk-on frictional driving connection between a hub and a shaft.

The locking composition consists in general of hard particles or abrasive grains of controlled size, commonly called "grit," or grinding powder, and a proper vehicle for those grains. It is to be understood that the hard particles or abrasive grains in the locking composition must be harder than both the shaft and the hub. While abrasive grains of various materials, such as emery, silicon carbide, Alundum, Carborundum, etc., may be used to carry out the invention, the preferred abrasive materials are emery or artificial corundum; since these materials are not only hard enough to cut into any common metal or alloy, but are also exceedingly tough and resist the great forces tending to crack the grains which are produced when hard and strong metals are forcibly wedged together under heavy axial pressure, according to the invention. It has been found that good results are obtained by using abrasive grain sizes known commercially as Grit No. 20 to Grift No. 36 for joining non-ferrous metals; and Grit No. 30 to Grit No. 54 for joining ordinary ferrous metals. However other grit sizes may be employed, according to the circumstances.

With respect to the vehicle for the grit, good results have been obtained by using a liquid lubricating lute consisting of litharge mixed with commercial glycerin to form a viscous liquid, into which the grit is stirred until a consistency is obtained which will adhere to metal surfaces without dripping. In the process of assembly, the grit-loaded lute is conveniently spread on the tapered end of the shaft, and then upon insertion in the bore of the collar, one mating part is rotated to distribute the grit evenly. The grit-loaded lute is of course extremely abrasive, and therefore all excess lute should be removed after the tapered joint is made to avoid any possible damage to working parts therefrom. After assembly, the composition sets to form a cement which is highly resistant to water, oil and acids. Thus, the locking composition protects the tapered surfaces from corrosion, facilitating their separation in case the parts are subsequently dismounted. For further particulars, refer to my United States Patent No. 2,617,672.

The coupling can be readily dismounted in the following manner: A socket wrench is applied to jack-screw 3 and sufficient torque exerted to loosen it. Jack-screw 3 is then backed-out with the wrench until its head comes tight against uncoupling thrust ring 4; then by further wrenching hub 2 is jacked loose from engagement with shaft 1. By turning jack-screw 3 out of engagement with shaft 1, hub 2 can be entirely removed. If the hub is to be replaced on the shaft immediately, thrust ring 4 and jack-screw 3 can be left in place in hub 2, which then can be remounted merely by reinserting that screw and tightening it as in the first instance. It has been found in practice that when hub is thus remounted, the grip of the hub on the shaft is substantially as strong as on the first application. Disassembling the parts is merely a matter of springing thrust ring 4 out of its groove and removing jack-screw 3 from hub 2; whereupon the parts can be readily cleaned for reuse. It is thus evident that hub 2 can be readily and positively secured on shaft 1, and afterwards readily dismounted, merely by the use of an ordinary socket wrench which is standard equipment for mechanics.

It has been found by experiment that the grip of hub 2 on shaft 1 can be adjusted for practical purposes by regulating the torque applied to the wrench when tightening jack-screw 3. Thus, by applying to jack-screw 3 the maximum torque which it will withstand, the grip of hub 2 on shaft 1 can be made strong enough to twist the shaft. But if it be desired to allow hub 2 to slip on shaft 1 under a certain torque load, say to avoid overload damage, the wrenching torque can be regulated systematically by using a torque wrench, according to the results desired. The device of the invention can thus be used as an overload or safety clutch to avoid accidental damage. In many practical applications to machinery, this feature of the invention of permitting overload slipping without damage is highly advantageous, and overcomes one of the major drawbacks of keyed shaft couplings, which may cause substantial damage to the shaft or connected machinery if overloaded. Moreover, it is well-established that the strength of a shaft in torsion may be reduced as much as 20% by cutting in it a keyway of the usual proportions; whereas a tapered keyless joint made according to the invention does not weaken the shaft, allowing a heavy torque to be transmitted without damage such as would produce failure of an ordinary keyed shaft.

Referring now to the FIGS. IV and V, which illustrate another embodiment of the teaching of the invention, particularly adapted to small shafts; in this case the shaft 1 is solid with a threaded socket in the tapered end adapted to receive jack-screw 3; while the latter has a head provided with a hexagonal socket. A thrust ring 4 is seated in a groove in the counterbore of hub 2, as before. Hub 2 is mounted and dismounted as before described, except that a key wrench of hexagonal section to fit the hexagonal socket in jack-screw 3 is utilized.

Referring now to FIGS. VI and VII, which illustrate the application of the invention to a hub 2 of relatively small diameter, such as a propeller hub; in this case shaft 1 is provided with a threaded end portion 6, which mates with jack-screw element 3, here having the form of a nut and preferably castellated and secured in place by a cotter 7, as is customary in propeller practice. Hub 2 is provided with a counterbore inside of which is provided a groove adapted to receive and retain thrust ring 4. Hub 2 is mounted on shaft 1, as before described, and forced tightly into place, and cotter 7 inserted in place and its ends spread, as shown.

To dismount hub 2, cotter 7 is removed and a wrench is used to back out jack-screw 3, the flange of which engages thrust ring 4 and pulls hub 2 away from the shaft. Thus, the use of a special propeller puller, which is ordinarily required to remove a propeller from its shaft, is avoided.

Referring now to FIGS. VIII and IX, which illustrate the application of the invention to a hollow shaft of large size, such as the hollow propeller shaft used on ships. In this case an auxiliary thrust transmitting element 8, which may have the form of a round disc or a ring, as shown, is used in addition to thrust ring 4; and a plurality of circularly arranged jack-screws 3 are provided. As indicated in FIG. IX, element 8 is provided with a double series of staggered holes equally spaced around the same circle. The holes of one series are threaded complementally to jack-screws 3, while the holes of the alternate series are slightly larger than the threaded portion of the mating screws and hence may be termed clearance holes. The tapered end of shaft 1 is provided with a single series of complementally threaded holes, spaced to match either the threaded or clearance holes in element 8. At assembly, the tapered end of shaft 1 is coated with locking composition 5, as before, and hub 2 mated therewith. Element 8 is then put in place in the bore of the hub, and jack-screws 3 are inserted through the clearance holes and screwed into the threaded holes in the shaft. Jack-screws 3 are then systematically tightened, using an ordinary wrench or a torque wrench, so as to draw hub 2 evenly and forcibly into contact with the taper or shaft 1. When jack-screws 3 are sufficiently tight, thrust ring 4 is snapped into place, completing the assembly. For purposes of dismounting hub 2 from shaft 1, jack-screws 3 are loosened, removed and transferred to the threaded holes *t* of element 8. Then by tightening jack-screws 3 systematically with a wrench, element 8 is thrust against thrust ring 4 and thereby the hub 2 is withdrawn from shaft 1. Thus, as before, hub 2 can be readily mounted on and dismounted from shaft 1 by the means of the invention implemented by an ordinary wrench. Whereas, in customary practice a special giant wrench and a sledge hammer or a power appliance such as a hydraulic jack are required to mount a propeller hub on a large shaft.

Referring now to FIGS. XI to XII inclusive, the embodiment there shown illustrates the application of the teaching of the invention to mounting a hub on an intermediate tapered portion of a shaft; as for example the case of mounting the hub 2 of a pinion or sprocket on the intermediate tapered portion of a shaft 1 supported between two bearings, not shown. Hub 2 is provided with a tapered bore complemental to the tapered portion of shaft 1, and also with a threaded counterbore, as shown. Jack-screw 3 having a hex head and an axial bore fitting shaft 1, is provided with a male portion threaded complementally to the counterbore of hub 2. Shaft 1 is provided with an external annular groove, and jack-screw 3 with a matching internal annular groove as shown; these grooves in combination being adapted to receive thrust ring 4, which locks jack-screw 3 rotatably on shaft 1. In this case thrust ring 4 can be a piece of spring wire of suitable length which is inserted in the groove endwise after jack-screw 3 is in place on shaft 1; two over-size holes being provided in jack-screw 3 for this purpose, as shown.

When mounting hub 2 on shaft 1, the preferred procedure is as follows: jack-screw 3 is placed in position on shaft 1 and locked thereon by inserting thrust ring 4 endwise in one of the holes provided and then pushing it into the position shown. Hub 2 is then slipped over the shaft and advanced to a position short of the tapered portion thereof. Locking composition 5 is then applied carefully to the tapered portion of shaft 1, after which hub 2 is moved up to and engaged with jack-screw 3, hub 2 then being rotated a few turns to distribute locking composition 5 evenly. Jack-screw 3 is then wrenched in tightly, thereby drawing the tapered surface into forcible engagement and embedding the hard particles therein, as before described, whereby hub 2 makes a positive connection with shaft 1. Dismounting hub 2 from shaft 1 is merely a matter of wrenching jack-screw 3 loose, thereby applying a reverse axial thrust to hub 2 which loosens it from shaft 1. Jack-screw 3 and hub 2 can then be easily separated by screwing them apart, after which hub 2 can be removed. Should it be desired to remove jack-screw 3 from shaft 1, thrust ring 4 can be removed by pushing one end deep into it shole, and then pulling on the projecting end.

In summary, it will be observed that in each embodiment illustrated the shaft 1 and hub 2 have complementally tapered surfaces; a suitable jack-screw element means 3 has been provided, whose particular function is to draw the tapered surfaces into forced tight engagement and to release them from such engagement; an uncoupling thrust ring 4 has been provided, whose main function is to sustain the enormous axial thrust produced by reverse operation of jack-screw element 3; and a locking composition 5 has been provided, whose primary function is to lock shaft 1 and hub 2 in positive engagement, whose secondary function is to lubricate the tapered surfaces to facilitate their forcible engagement, and whose tertiary function is to seal the tapered joint so as to prevent corrosion, thereby avoiding difficulty in breaking the joint. Further, that in each embodiment the grip of the coupling connection can be determined by regulating the torque applied to jack-screw 3 at assembly. Moreover, the particular form of uncoupling thrust ring 4 disclosed provides an extraordinary advantageous combination of practical characteristics and features; namely, simplicity of form, minimum size with maximum strength, minimum required space, selflocking, shake-proof; ease of assembly and disassembly without special tools; "blind" assembly and removal; minimum cost, ease of production; corrosion resistance, non-jambing, etc.

Without further analysis, the teaching of the invention and various modes of putting the invention into practice will be evident from the foregoing. While the methods described herein, and the forms of apparatus for carrying these methods into effect, constitute preferred embodiments, it is to be understood that the invention is not limited to these and that changes may be made in either without departing from the scope of the invention which is defined in the appended claims.

I claim:

1. A quickly mountable and demountable keyless coupling assembly capable of self-coupling and self-uncoupling operation by an ordinary wrench comprising in combination: a tapered shaft part with coaxial screw-threads; a mating coupling part having an axial tapered bore complemental to said shaft and mounted coaxially thereon, *said coupling part also having a plain coaxial counterbore with a circular abutment at its inner end, said counterbore having a plain circumferential half-round groove intermediate its ends; a resilient plain thrust-ring of round section and with open ends spring-seated in said circumferential groove and extending thereinto for approximately half the radial thickness of the section;* and a reversible semi-automatic push-pull screw-jack mechanism for forcibly pushing said parts into coupling engagement and subsequently forcibly uncoupling and pulling said parts apart; said mechanism including said parts, *said thrust-ring,* and a reversibly rotatable axially traveling push-pull jack-screw shaped in part so as to be rotatable by an ordinary wrench and having coaxial screw-threads engaging with the aforesaid coaxial screw-threads so as to cause said jack-screw to travel axially when so rotated and having an *integral* round driving part working in said counterbore between said abutment and said thrust-ring, said driving part having an under circular bearing surface slidable upon said abutment during pushing operation of said jack-screw, *and an outer circular chamfered corner adapted to slide on said thrust-ring on uncoupling operation of said jack-screw and to wedge said thrust-ring outwardly into said groove, thereby to lock said thrust-ring against dislodgement from said groove by combined thrust and torsional forces applied by said jack-screw.*

2. The combination set forth in claim 1, which further includes a *lute composition containing hard particles distributed evenly between said tapered parts whereby* coupling operation of said screw-jack mechanism embeds said particles jointly in said parts and thus positively locks said coupling part on said shaft.

3. A quickly mountable and demountable keyless coupling assembly capable of self-locking and self-unlocking operation by an ordinary wrench comprising in combination: a tapered shaft part with coaxial screw-threads; a mating coupling part having an axial tapered bore complemental to said shaft part and mounted coaxially thereon, *said coupling part also having a plain coaxial counterbore with a circular abutment at its inner end, said counterbore having a plain circumferential groove intermediate its ends; a resilient plain thrust-ring of uniform section and with open ends spring-seated in said circumferential groove and extending thereinto for approximately half the radial thickness of its section;* and a reversible semi-automatic push-pull screw-jack mechanism for forcibly pushing said parts into locking engagement and subsequently forcibly unlocking and pulling said parts apart; said mechanism including said parts, *said thrust ring,* and a rotatable reversible axially traveling push-pull screw-element shaped in part so as to be rotatable by an ordinary wrench and having coaxial screw-threads engaging with the aforesaid coaxial screw-threads so as to drive said screw-element along said shaft, *and having an integral round driving part*

*working in said counterbore between said abutment and said thrust-ring,* said driving part also having an under washer face slidable upon said abutment during locking operation of said screw element, *and an outer circular bearing surface beveled so as to slide on said thrust-ring and wedge same outwardly into said groove, thereby to hold said thrust-ring immovably in said groove during unlocking operation of said screw element.*

4. The combination set forth in claim 3, which further includes a *lute composition including abrasive particles harder than both the shaft and coupling parts distributed evenly between their tapered surfaces;* whereby pushing operation of said screw-jack mechanism embeds said particles jointly into said parts, thereby locking these parts positively together.

References Cited in the file of this patent
UNITED STATES PATENTS

| | | |
|---|---|---|
| 2,475,042 | McCloskey | July 5, 1949 |
| 2,617,672 | Nichols | Nov. 11, 1952 |
| 2,662,663 | Schmidt et al. | Dec. 15, 1953 |

FOREIGN PATENTS

| | | |
|---|---|---|
| 164,285 | Switzerland | Dec. 1, 1933 |